United States Patent [19]
Koeln et al.

[11] Patent Number: 5,719,949
[45] Date of Patent: Feb. 17, 1998

[54] PROCESS AND APPARATUS FOR CROSS-CORRELATING DIGITAL IMAGERY

[75] Inventors: Gregory T. Koeln, Germantown; Roger A. Mitchell, Chevy Chase, both of Md.

[73] Assignee: Earth Satellite Corporation, Rockville, Md.

[21] Appl. No.: 605,625

[22] Filed: Feb. 22, 1996

Related U.S. Application Data

[63] Continuation of Ser. No. 332,274, Oct. 31, 1994, abandoned.
[51] Int. Cl.⁶ .................................................. G06K 9/00
[52] U.S. Cl. ............................ 382/113; 382/109; 348/144
[58] Field of Search ............................. 382/100, 109, 382/113, 284; 348/143–147

[56] References Cited

U.S. PATENT DOCUMENTS

| | | | |
|---|---|---|---|
| 4,364,085 | 12/1982 | Dalke | 348/144 |
| 4,706,296 | 11/1987 | Pedotti et al. | 382/278 |
| 4,984,279 | 1/1991 | Kidney et al. | 382/284 |
| 5,187,754 | 2/1993 | Currin et al. | 382/284 |

OTHER PUBLICATIONS

Mattikalli, "An Integrated Geographical Information System's Approach . . ." Feb. 1994 pp. 1204–1206.

Villasenor et al, "Change Detection on Alaska's North Slope . . ." pp. 227–236 Jan. 1993.

Takahashi et al. "LANDSAT Image Data Processing System" pp. 261–266 Oct. 1980.

Leib et al, "Aerial Reconnaissance Film Screening Using Optical Matched–Filter . . . " pp. 2892–2899 Sep. 1978.

*Primary Examiner*—Leo Boudreau
*Assistant Examiner*—Christopher S. Kelley
*Attorney, Agent, or Firm*—Dickstein Shapiro Morin & Oshinsky LLP

[57] ABSTRACT

The present invention involves a system and method for processing information from high resolution data from maps, aerial photographs and other spatial data with low resolution data from limitation in order to accurately identify changes in the studied areas. The system and method relies upon a vectorized database which has been classified according to topographical features. Change is defined by a Z-statistic. The Z-statistic is calculated in a two-pass cross-correlation technique when pixel brightnesses are compared to a mean brightness for the typical topographical class and to a standard deviation for that class. The normalized difference values are accumulated across different bands, are scaled and then compared to a threshold which defines high, medium and low change values. A map is automatically produced illustrating areas of significant change.

9 Claims, 13 Drawing Sheets

(6 of 13 Drawing(s) in Color)

PROCESS AND APPARATUS FOR CROSS-CORRELATING DIGITAL IMAGERY

This application is a continuation, of application Ser. No. 08/332,274, filed Oct. 31, 1994, now abandoned.

BACKGROUND OF THE INVENTION

1. Field of the Invention

The invention includes a process and an apparatus for correlating digital imagery and digital geographic information for the detection of changes in land cover and land use between the dates of the digital imagery and the baseline geographic information, and for verifying land cover and land use maps.

2. Background of the Art

An area of increasing interest and concern is how to extend the utility of satellite imagery to the assessment of both local and global environmental changes. The extension of satellite remote sensing technology into these areas benefits society by providing a better understanding of the causes and consequences of pollution, global environmental change, land use change, natural disasters, etc. Satellite imagery has increasingly been used as a data source for creating and updating geographic and environmental information.

Geographic information systems (GIS) are increasingly being used to analyze environmental and natural resource data. A geographic information system (GIS) is an apparatus/process that is used by natural resource scientists, environmentalists, and planners to collect, archive, modify, analyze and display all types of geographically referenced data and information.

Satellite data are increasingly used in GIS to characterize the earth's resources. However, these data fail to provide the detail and accuracy that more traditional, but costly data, such as aerial photographs of the studied phenomena can provide. Traditionally, photography has been used for these applications.

Many satellite image processing techniques focus on ways to increase the ability to efficiently and more accurately extract information from the raw satellite data. One shortcoming of techniques for processing satellite data is that they fail to provide the high spatial resolution required to monitor subtle changes in critical resources. For example, Fletcher et al., U.S. Pat. No. 3,984,671 discloses a method for producing single and multi-class composite classification maps from multispectral imagery provided by the ERTS-1 (Landsat-1) satellite. However, Fletcher et al. do not address how ERTS-1 data can be extended or improved to areas where higher spatial resolution is required for change detection.

The need to increase spatial resolution for change detection is particularly acute with respect to the low spatial resolution data available from the earth sensing satellites (e.g. Landsat, JERS, MOS, ERS, SPOT, AVHRR).

For example, Landsat, which was developed by the National Aeronautics & Space Administration (NASA) as a research satellite designed to address a variety of earth resource and environmental issues, is a suitable data source for some mapping and gross change detection functions (Landsat), but is a poor substitute for conventional aerial photography for many other applications.

There are two major limitations of satellite data for many applications: spatial resolution and spectral resolution. The spatial resolution of existing satellite data ranges from 10 meters to 1.1 km. To discriminate changes in some features, such as wetlands, higher spatial resolution is required. Small areas (such as 1–2 acre wetlands) cannot be discriminated using available satellite data. Spectral resolution problems arise when the reflected radiance of different studied features is similar. Repetitive imaging of the same features may be required to differentiate between similar reflectances, and in some cases differentiation is impossible. This problem is acute in the mapping of wetlands. Many other critical applications exist, where there is a need for detail and accuracy coupled with the pressure to reduce costs and provide for immediate data. These areas include monitoring: global environmental change, urban expansion, forestry loss, agricultural encroachment, range land degradation, wind and water erosion, and vegetation stress from pollutants and disease. These are areas where this invention can be applied. An illustration of such shortcomings with regard to wetlands monitoring is discussed below in more detail. However, the problem of spatial and spectral resolution can be found with respect to many other applications than those noted above.

Since the late 1970's, the U.S. Fish & Wildlife Service (USFWS) has been mapping the nation's wetlands. More than 30,000 detailed wetlands maps have been produced as part of the National Wetlands Inventory (NWI). NWI maps cover nearly 70% of the conterminous U.S., 21% of Alaska, and all of Hawaii. Most of the maps cover the same area covered by the 7.5 minute, 1:24,000 scale topographic maps produced and distributed by the United States Geological Survey. However, some NWI maps have been produced at scales as small as 1:100,000.

The maps have excellent consistency because they have a common classification system, common photo-interpretation conventions, and common cartographic conventions. An explanation of the classification of wetlands can be found in Cowardin et al., "Classification of wetlands and deep water habitats of the United States," U.S. Fish & Wildlife Service, REP. FWS/OBS 79/31,103, the details of which are hereafter incorporated by reference.

As of April 1991, and as required by the Emergency Wetlands Resource Act of 1986, more than 1.1 million copies of the thirty thousand NWI maps had been distributed and the USFWS is on schedule to complete the mapping of the conterminous U.S. by 1998. Mapping in Alaska should be completed by the year 2000. Most of these maps produced during the late 1970's and early 1980's used aerial photography as the principal source of data. These maps were produced at great expense (i.e., $10,000 per map), and some of the early maps already require updating. A technique to expressly identify those maps requiring updating is sorely needed to avoid the enormous expenditure of remaking maps of areas which have not changed.

In order to meet the rigorous wetland mapping requirements, NWI has had to rely upon existing aerial photography, and visual photo-interpretation techniques, for mapping wetlands. Many of the photographs used for mapping wetlands were acquired by the United States Geological Survey's (USGS) National High Altitude Photography Program (NHAP) in the mid to late-1970's and early 1980's. As a result, the aerial photography used to develop many of the wetland maps is now 10 to 20 years old. Consequently, a number of the wetland maps produced from the 1970's or early 1980's may be of diminished value today due to wetland changes over the intervening years. Indeed, without a technique which rapidly provides accurate, current data in an efficient manner, the only means for providing updated wetlands maps is to repeat the costly original mapping process using new aerial photographs. Such an effort is unlikely to keep pace with the rapid changes in some regions of the country, while remapping some other areas which do not require remapping.

A logical approach to meeting the need to update wetlands maps would be to employ satellite imagery which are available continuously, at 10% of the cost of aerial photography, so long as these data can meet the spatial requirements of the classification scheme noted above. The U.S. Government, however, has concluded that satellite data cannot match the accuracy of aerial photography. Moreover, satellite data can discriminate only a few wetland classes, and cannot detect some wetlands at all (such as forested wetlands or scrub-shrub wetlands). Using satellite data exclusively would thus result in an overall misestimate of the acreage of individual wetlands. A misestimate can have enormous impact on society and on the environment.

SUMMARY OF THE INVENTION

It is therefore apparent from the above that there exists a significant need for a system and process which effectively uses low resolution image data, such as that provided by satellites, in a manner that identifies changes and areas of greatest need for remapping. In the example discussed above, while satellite data cannot be used exclusively to meet the rigorous mapping requirements of the NWI, these data can be analyzed using the system and the process of the present invention, to accurately and cost-effectively identify those maps that require updating. It is therefore one of the objectives of this invention to provide a system and process which correlates low resolution digital information with higher resolution information to rapidly identify areas of greatest change. Phenomena can be measured for wetlands, urban expansion, forestry loss, agricultural encroachments, range land degradation, wind and water erosion, Vegetation stress from pollutants and disease, and global environmental change.

Another object of this invention is to provide a process in which changes in the area of interest are identified without the need to describe the nature of those changes.

Another object of this invention is to provide a system and process which automatically certifies that areas under study have not significantly changed or are correctly mapped.

Another object of the invention is to provide a system and process for establishing thresholds of change.

An additional object of this invention is to correlate information extracted from high resolution sources to low resolution sources.

Another object of the invention is to identify the optimal set of low resolution image bands used for a particular application by first evaluating the low resolution image data. The selection of optimal image bands dramatically increases the efficiency of the process.

Another objective is to provide change detection of a vector data set within a single date of aerial or satellite images.

Yet a further object of the invention is to assign a numeric code to each higher resolution vector. In the preferred embodiment, that code provides information as to the system, subsystem, class, subclass and modifier descriptors for the high resolution vector. Coding can reflect a number of different schemes including assigning integer values for each particular classification category. In the above-noted example, the classification codes represent different types of wetlands (up to 255 different wetland types). Non-wetlands are assigned a low or zero integer value.

It is also an object of the invention to group certain classes into a single class when those classes exhibit similar ecological characteristics. The grouping of classes eliminates the problems of sample size associated with having too few occurrences of a specific class.

A further object of this invention is to detect changes in areas shown on the low resolution image by calculating, on a cell-by-cell basis, a band-by-band deviation from the mean spectral value of the cell's class from the observed spectral value of the cell.

Another object of the invention is to provide a system and a process which automatically rectifies low resolution satellite data.

It is a further object of the invention to provide a cost-effective image processing apparatus which can be implemented on a microprocessor in a production environment.

A further object of this invention is to calculate a change statistic. Several spectral bands of the low resolution images are added together to derive an accumulative measure of deviation for each cell. A statistic (termed the "Z" statistic) is then calculated to identify significant deviations and hence significant changes between the classified higher resolution pixels and the lower resolution pixels.

Briefly described, these and other objects of the invention are accomplished by providing a system and process for analyzing change in a study area by converting high resolution polygonal vector data to a vector format of the present invention and rectifying the low resolution data to the high resolution data; comparing low resolution data to the higher resolution polygonal vectors; classifying the vectorized data, and rasterizing the low resolution data (i.e., pixels) into uniform sized cells for addressable storage.

The system and process also include a low resolution information processor for converting low resolution information into uniform sized cells which can be precisely registered to the high resolution information. A function or processor is used to determine the mean brightness value for each pixel class. A statistical valuation function then calculates a change value which may be compared to classification thresholds. The comparison function matches pixel classes to various thresholds to identify pixels having significantly changed values. An output function or converter converts the significantly changed values to graphical representations for each visual identification.

With these and other objectives, advantages and features of the invention that may become apparent, the nature of the invention may be more clearly understood by reference to the following detailed description of the invention, the appended claims, and to the several drawings attached herein.

DETAILED DESCRIPTION OF THE INVENTION

Figure 1:
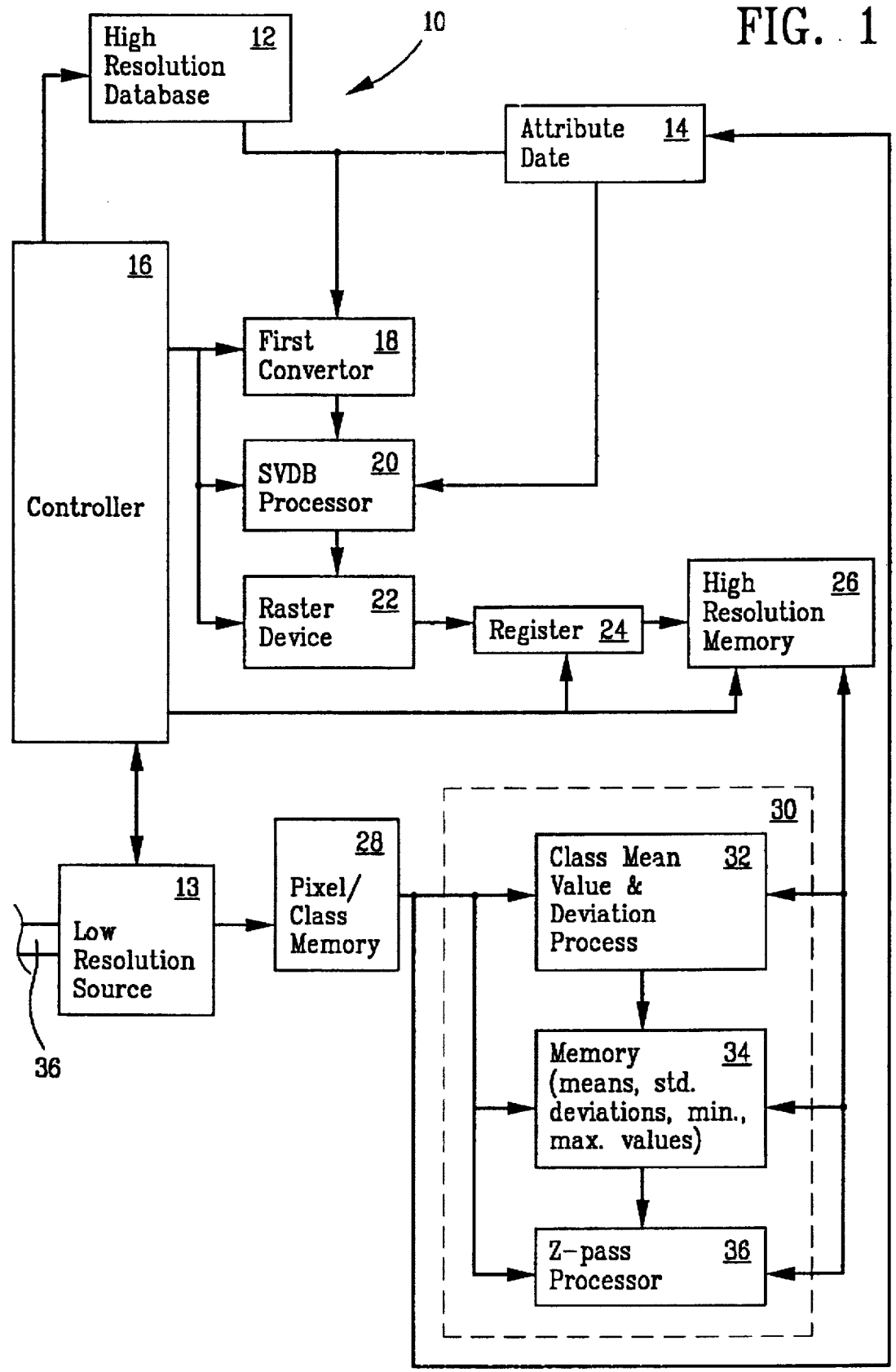
FIG. 1 is a hardware block diagram of the high resolution apparatus of the present invention.

Referring now to the drawings wherein like elements refer to like reference numerals throughout, FIG. 1 shows the hardware arrangement for the image processing system according to the present invention. Specifically, FIG. 1 illustrates a system for converting high resolution data, such as maps derived from aerial photographs, so that such data can be used in conjunction with lower resolution, cheaper and more current data, to evaluate certain phenomena and provide greater information to the analyst than either data set used alone. The preferred embodiment of the data processed by this invention relates to using NWI vector data described above as the high resolution data source, and Landsat Thematic Mapper imagery as the low resolution data source. However, the processes and apparatus described herein can be applied to any other high or low resolution data sources.

It has been found in the preferred embodiment, that imagery provided from the Landsat satellitic, known as Thematic Mapper imagery, cannot accurately meet the mapping requirements and delineate and describe wetland types according to the legend and mapping conventions of the NWI. Using the present invention, though, it has been found that areas can be identified where changes have occurred. In the present invention, FIG. 1 illustrates an apparatus 10 for converting maps derived from high resolution data to a format which makes it possible to compare them to low resolution data pixel-by-pixel. (A pixel is the smallest data element of the low resolution data set.) The apparatus 10 includes a high resolution database 12 which can store either digital or digitized representations of analog objects to be analyzed.

In the preferred embodiment, the aerial image data are archived as interpretive maps derived from aerial photos, as is done conventionally in the art. Specifically, the aerial images are loaded into the database 12 as digital line graph ("DLG") data.

Figure 2:
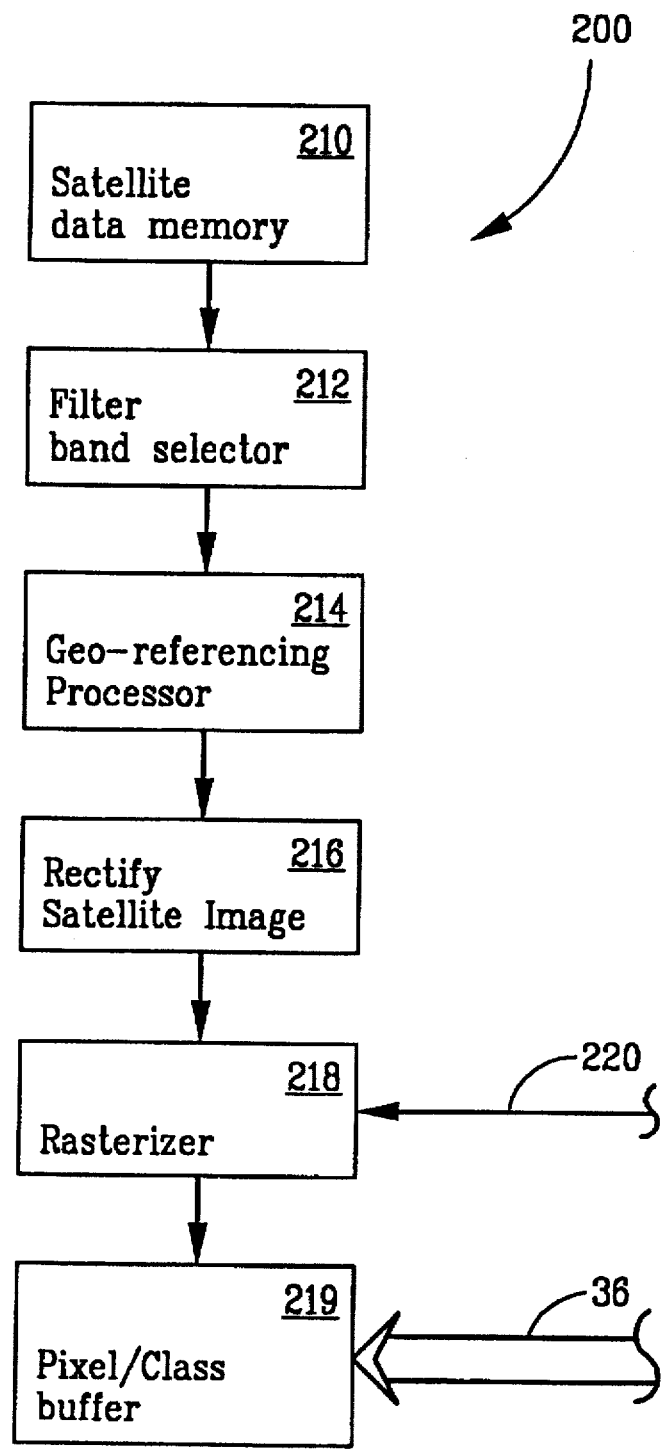
FIG. 2 is a hardware block diagram of the low resolution apparatus of the present invention.
Figure 3:
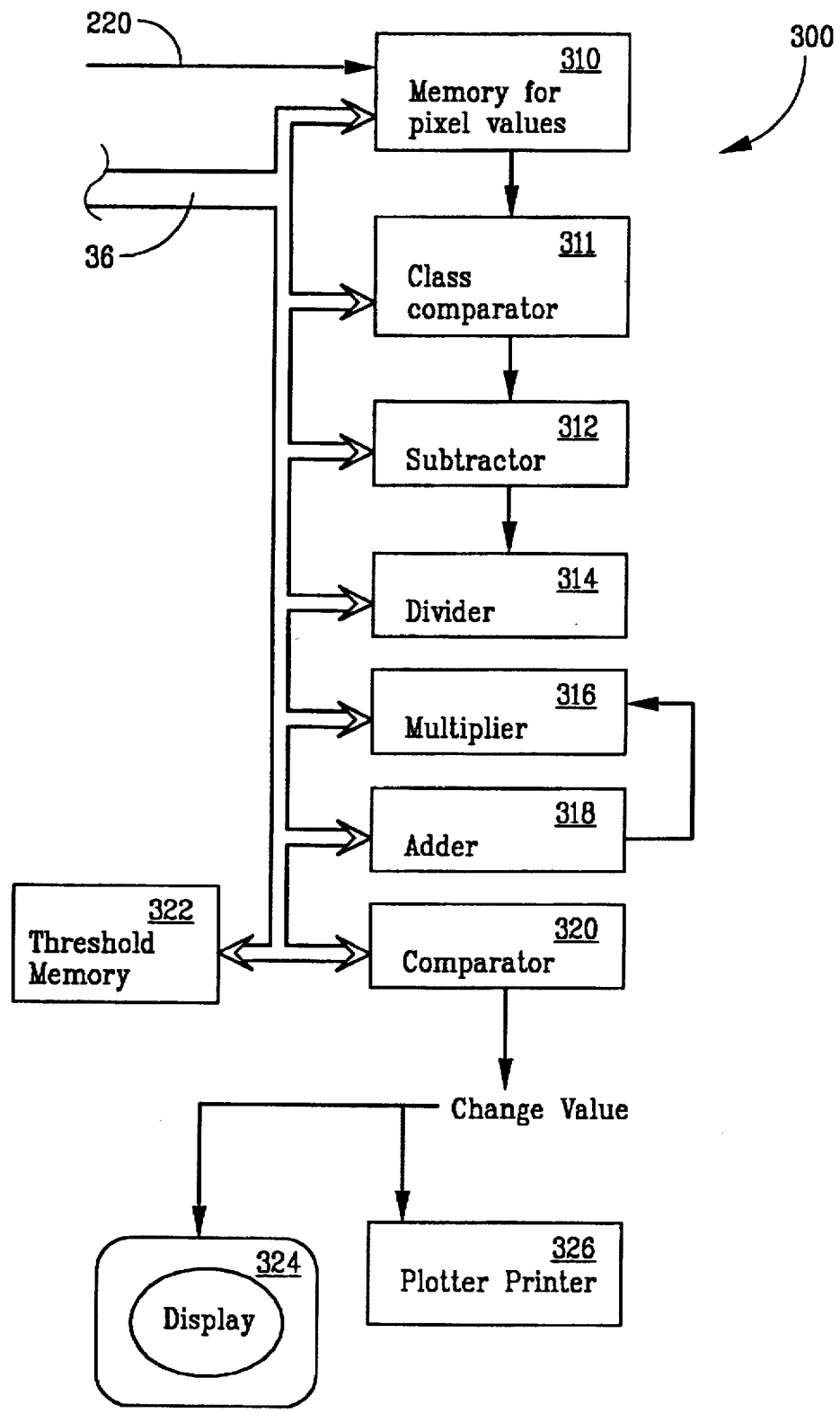
FIG. 3 is a hardware block diagram of the cross-correlation apparatus of the invention.

If the data 12 are in the form of an electronic database 12, they can be connected to an appropriate controller 16 which is adapted to coordinate, control, monitor and execute commands necessary for operating the low and high resolution input devices of FIGS. 1 and 2, as well as the cross-correlation unit of FIG. 3. The functions performed by controller 16 are communicated to the hardware elements of FIGS. 1–3 via communications bus 36 and the various control lines running from the controller 16 to its associated equipment of FIGS. 3. The controller 16 can comprise any appropriate microprocessor or minicomputer control device including, but not limited to, a PC-based controller or a dedicated control machine. In addition, the controller can comprise software implemented as a control program.

For example, for certain processing environments, a Solbourne NE UNIX-based minicomputer is used. The Solbourne has a 128 MIPS processor, 256 Kbytes of RAM and 40 gigabytes on hard drive. The Solbourne supports twelve terminals, a CIRRUS film recorder, three digital plotters, five digitizing tablets, and four laser printers.

Due to the efficiencies realized by virtue of the two pass cross-correlation system and process described herein, massively parallel computations necessary in many image processing applications are avoided. Thus, the cross-correlation system and/or process of the present invention could be implemented on a 486-based machine, even in a production environment. With regard to FIG. 1, the controller 16 provides commands relating to the input, conversion, and read-out of the high resolution data in database 12. Moreover, the controller 16 is responsible for coordinating the operations of the downstream hardware.

The database 12 is connected to an attribute memory 14. The purpose of the attribute memory is to store appropriate coding classifications that will be used in conjunction with the high resolution data contained in the database 12, and with the low resolution data stored in a separate memory that is shown in FIG. 2.

In the preferred embodiment, the attribute memory 14 stores a classification code for wetlands which is based on a unique numeric code assigned to each wetland class. However, any classification scheme can be used, depending upon the type of application. For example, the land use classification system developed by Anderson et al. (See U.S. Geol. Surv. Proj. Pap. 964) or the Florida Land Use Classification System, (see Florida Land Use and Form Classification System. Dept. of Transportation, State Topographic Bureau, Thematic Mapping Section.) can be used. In the preferred embodiment, it is known that a single wetland map may have over two hundred different types of wetlands where each type of wetland is a unique combination of system, subsystem, class, subclass and modifiers for a given habitat. The numeric coding scheme in the present invention assigns a particular wetland classification to each polygon of the high resolution NWI map and the low resolution thematic mapper image. The classification is conducted down to at least the subclass level. The classification scheme is based upon the aforedescribed work by Cowardin et al., *Classification of Wetlands in Deepwater Habitats of the United States*, U.S. Department of Interior, Fish and Wildlife Service, December 1979.

The classification scheme converts the Cowardin taxa noted above into an eight bit code that defines the wetland system, subsystem class, subclass, and modifier which are exemplified below as chart 1.0. For example, for an estuarine system, subtidal subsystem open water subtidal regime, the code would be E1OWL and an integer value of 2 would be assigned to this wetland class. A chart of the exemplified study area classification definitions is provided below:

CHART 1

| Wetland Class | Wetland Number Assigned | System | Subsystem | Class | Subclass | Modifiers |
|---|---|---|---|---|---|---|
| E1ABLxns | 1 | Estuarine | Subtidal | Aquatic Bed | | Excavated, Mineral, Spoil |
| E1OWL | 2 | Estuarine | Subtidal | Open Water | | Subtidal |
| E1OWL6 | 3 | Estuarine | Subtidal | Open Water | | Subtidal, Oligohaline |
| E1OWL6 | 4 | Estuarine | Subtidal | Open Water | | Subtidal, Oligohaline, Excavated |
| E1OWL | 5 | Estuarine | Subtidal | Open Water | | Subtidal, Excavated |
| E1UB4L | 6 | Estuarine | Subtidal | Unconsolidated Bottom | Organic | Subtidal |
| E1UB4L6 | 7 | Estuarine | Subtidal | Unconsolidated Bottom | Organic | Subtidal, Oligohaline |
| E1UB4L6X | 8 | Estuarine | Subtidal | Unconsolidated Bottom | Organic | Subtidal, Oligohaline, Excavated |
| E1UB4LX | 9 | Estuarine | Subtidal | Unconsolidated Bottom | Organic | Subtidal, Excavated |
| E1UB4Lx | 10 | Estuarine | Subtidal | Unconsolidated Bottom | Organic | Subtidal, Excavated |
| E1UBL | 11 | Estuarine | Subtidal | Unconsolidated Bottom | | Subtidal |
| E1UBLH | 11 | Estuarine | Subtidal | Unconsolidated Bottom | | Subtidal, Diked/Impounded |
| E1UBL6 | 12 | Estuarine | Subtidal | Unconsolidated Bottom | | Subtidal, Oligohaline |
| E1UBL6X | 13 | Estuarine | Subtidal | Unconsolidated Bottom | | Subtidal, Oligohaline, Excavated |
| E1UBLX | 14 | Estuarine | Subtidal | Unconsolidated Bottom | | Subtidal, Excavated |
| E1UBLx | 15 | Estuarine | Subtidal | Unconsolidated Bottom | | Subtidal, Excavated |
| E1USN | 16 | Estuarine | Subtidal | Unconsolidated Shore | | Regularly Flooded |
| E2AB2P6 | 17 | Estuarine | Intertidal | Aquatic Bed | Submergent vascular | Irregularly Flooded, Oligohaline |
| E2ABN | 18 | Estuarine | Intertidal | Aquatic Bed | | Regularly Flooded |
| E2ABP | 19 | Estuarine | Intertidal | Aquatic Bed | | Irregularly Flooded |
| E2ABP6 | 20 | Estuarine | Intertidal | Aquatic Bed | | Irregularly Flooded, Oligohaline |
| E2EM/SS1P | 21 | Estuarine | Intertidal | Emergent/Shrub-Scrub | /Broad-Leaved Deciduous | Irregularly Flooded |
| E2EM1/SS1P6 | 21 | Estuarine | Intertidal | Emergent/Shrub-Scrub | Persistent/Broad-Leaved Deciduous | Irregularly Flooded, Oligohaline |
| E2EM1/FO5P | 22 | Estuarine | Intertidal | Emergent/Forested | Persistent/Dead | Irregularly Flooded |
| E2EM1N | 23 | Estuarine | Intertidal | Emergent | Persistent | Regularly Flooded |
| E2EM1NX | 23 | Estuarine | Intertidal | Emergent | Persistent | Regularly Flooded, Excavated |
| E2EM1Nns | 24 | Estuarine | Intertidal | Emergent | Persistent | Regularly Flooded, Mineral, Spoil |
| E2EM1P | 25 | Estuarine | Intertidal | Emergent | Persistent | Irregularly Flooded |
| E2EM1Ph | 25 | Estuarine | Intertidal | Emergent | Persistent | Irregularly Flooded, Diked/Impounded |
| E2EM1P6 | 26 | Estuarine | Intertidal | Emergent | Persistent | Irregularly Flooded, Oligohaline |
| E2EM1P6d | 26 | Estuarine | Intertidal | Emergent | Persistent | Irregularly Flooded, Oligohaline, Partially Drained/Ditched |
| E2EM1Pdpub(w | 27 | Estuarine | Intertidal | Emergent | Persistent | Irregularly Flooded, Partially Drained/Ditched, **** |
| E2EM1P | 28 | Estuarine | Intertidal | Emergent | Persistent | Irregularly Flooded, Spoil, Alkaline, Artificial Substrate |
| E2EM1U | 29 | Estuarine | Intertidal | Emergent | Persistent | Unknown |
| E2EM1Uh | 29 | Estuarine | Intertidal | Emergent | Persistent | Unknown, Diked/Impounded |
| E2EM1U6 | 30 | Estuarine | Intertidal | Emergent | Persistent | Unknown, Oligohaline |
| E2EM1Usir | 31 | Estuarine | Intertidal | Emergent | Persistent | Unknown, Spoil, Alkaline, Artificial Substrate |
| E2EM2N6 | 32 | Estuarine | Intertidal | Emergent | Nonpersistent | Regularly Flooded, Oligohaline |
| E2EM5/2N6 | 33 | Estuarine | Intertidal | Emergent | Nonpersistent/Narrow-leaved Persistent | Regularly Flooded, Oligohaline |
| E2EM5/FLN6 | 34 | Estuarine | Intertidal | Emergent/Flat | Nonpersistent/Narrow-leaved Persistent | Regularly Flooded, Oligohaline |
| E2EM5N | 35 | Estuarine | Intertidal | Emergent | Nonpersistent/Narrow-leaved Persistent | Regularly Flooded |
| E2EM5P | 36 | Estuarine | Intertidal | Emergent | Nonpersistent/Narrow-leaved Persistent | Irregularly Flooded |
| E2EM5P6 | 37 | Estuarine | Intertidal | Emergent | Nonpersistent/ | Irregularly Flooded, Oligohaline |

CHART 1-continued

| Wetland Class | Wetland Number Assigned | System | Subsystem | Class | Subclass | Modifiers |
|---|---|---|---|---|---|---|
| E2EM5Pd | 38 | Estuarine | Intertidal | Emergent | Narrow-leaved Persistent Nonpersistent/ Narrow-leaved Persistent | Irregularly Flooded, Partially Drained/Ditched |
| E2FLM | 39 | Estuarine | Intertidal | Flat | | Irregularly Exposed |
| E2FLN | 40 | Estuarine | Intertidal | Flat | | Regularly Flooded |
| E2FLN6 | 41 | Estuarine | Intertidal | Flat | | Regularly Flooded, Oligohaline |

The classification data (hereinafter NWI data) are interpreted in a manner which associates the NWI data with an interpreted vector of the high resolution data. Interpretation involves two steps: First, the high resolution data are vectorized to conform to study parameters. In the wetlands example, vectorizing means identifying wetlands, and then segregating the discrete areas of the wetland which have identifiable characteristics. The vectorizing process typically creates polygons. If this process is done manually, then an overlay is created which is designed to be placed over the aerial photograph. If this process is done automatically, as in the present system, then an appropriate designation as described by the production facility is produced to represent the polygon.

The second interpretation step involves assigning the attribute data 14 to the polygons. Again, the assignment process may be done manually by having the operator create another overlay that corresponds to the vectors. However in the present system, the attributes can be attached automatically using a code/addressing algorithm for the vectors. In the preferred embodiment, at least two hundred different NWI classification types are coded. When more than 255 wetland types are found in a study area, the "most" similar types of classification are coded to have the same numeric value. Non-wetlands (such as uplands) are assigned a value of zero or may be assigned another value higher than the last wetland assignment.

In order to assign proper attributes to each high resolution data set, the data must be converted into cells or units of uniform size. In the preferred embodiment, the DLG high resolution data are converted into polygonal vectors by a converter 18. The conversion process employs standard techniques for translation from most standard vector formats to the polygonal vector format used by the system. In the present embodiment, the preferred converter is the Arc Info conversion routine sold by Environmental Systems Research Institute, of Redlands, Calif.

The conversion 18 involves rasterizing the derived DLG data by the raster device 22. The device 22, in turn is a conventional hardware raster or is a rasterizer program such as Arc Info module, "Polygrid"®. In each scan, a rasterized line of data is sent to the shift register 24 which is then stored in the high resolution vector memory 26. The functions of the shift register 24 can also be implemented by appropriate computer software. As a consequence, each raster line can be separately encoded and separately addressed in the high resolution vector memory via controller 16.

In order to perform the cross-correlation analysis, two processes on the high and low resolution data are necessary. The first process 32 involves determining the mean and standard deviation values of the low resolution data for each class value of the high resolution data set. A standard deviation and mean value processor 32 is controlled by the controller 16 and is connected to the high resolution vector memory 26.

In the preferred embodiment, to retrieve sufficient information to derive the cross-correlation values, NWI classes are selected so that a sufficient sample size exists in order that accurately calculated mean, minimum, maximum and standard deviation values for the low resolution data using the resolution data as the zones occurs. These individual pixel brightnesses for each raster scan vector are also stored in the pixel classification memory 28.

The cross-correlation routine has been implemented in ELAS, ERDAS, and Arc/Info. The first implementation was within ELAS. ELAS is a raster-based image processing software system that was initially developed by NASA. Many of the functions of cross-correlation analysis can be implemented within ELAS, but other functions of cross-correlation could not be implemented without adding additional functions to ELAS. To prototype the system, these required additional functions were re-created using the FORTRAN language. However, these FORTRAN models were external to ELAS and made the performance of cross-correlation awkward and inefficient.

The implementation in ERDAS also required external FORTRAN modules. ERDAS is a commercially available image processing software system which can be purchased from ERDAS of Atlanta, Ga. Cross-correlation could not be fully implemented within ERDAS using the existing modules. Other FORTRAN modules were written, but this implementation of the cross-correlation procedures had the same limitations of the ELAS implementation.

Finally, cross-correlation was implemented within Arc/Info, a commercial GIS software system created and distributed by Environmental System Research Institute (ESRI) of Redlands, Calif. The cross-correlation procedures were implemented within Arc/Info using only existing Arc/Info modules and required no additional external programming. Arc/Info has its own programming language called Arc/Info Macro Language (AML) and cross-correlation was implemented by writing an AML for the entire process. No additional modules had to be created.

A sample of the data produced by the processor 32 for the exemplified wetland is set forth in the Table below:

CHART 1.1

| INF CLS CLASS | PIXELS | CH 1 | CH 2 | CH 3 | CH 4 | CH 5 | CH 6 CH |
|---|---|---|---|---|---|---|---|
| −2 | 72440 | 66 (−42) | 24 (−6) | 18 (−7) | 11 (−4) | 7 (−4) | 3 |
|  | MIN: | 59 | 18 | 12 | 3 | 0 | 0 |
|  | MAX: | 125 | 72 | 83 | 133 | 136 | 82 |
|  | STD: | 5 | 4 | 5 | 9 | 12 | 5 |
| −3 | 23696 | 68 (−41) | 27 (−3) | 24 (−12) | 12 (−5) | 7 (−4) | 3 |
|  | MIN: | 62 | 22 | 17 | 5 | 0 | 0 |
|  | MAX: | 94 | 47 | 54 | 93 | 89 | 53 |
|  | STD: | 2 | 2 | 3 | 6 | 8 | 4 |
| −4 | 37 | 73 (−44) | 29 (−1) | 28 (6) | 34 (0) | 34 (−20) | 14 |
|  | MIN: | 63 | 24 | 21 | 21 | 15 | 7 |
|  | MAX: | 78 | 32 | 31 | 54 | 64 | 28 |
|  | STD: | 4 | 2 | 2 | 7 | 10 | 4 |
| −5 | 32 | 78 (−45) | 33 (0) | 33 (17) | 50 (13) | 63 (−38) | 25 |
|  | MIN | 68 | 24 | 21 | 20 | 23 | 7 |
|  | MAX | 98 | 46 | 53 | 81 | 116 | 47 |
|  | STD: | 6 | 4 | 7 | 14 | 21 | 9 |
| −6 | 22 | 73 (−43) | 30 (0) | 30 (8) | 38 (11) | 49 (−29) | 20 |
|  | MIN: | 68 | 26 | 25 | 20 | 24 | 9 |
|  | MAX: | 78 | 34 | 35 | 74 | 77 | 34 |
|  | STD: | 3 | 2 | 3 | 13 | 17 | 7 |
| −7 | 18 | 74 (−44) | 30 (0) | 30 (21) | 51 (11) | 62 (−35) | 27 |
|  | MIN: | 65 | 21 | 19 | 28 | 25 | 13 |
|  | MAX: | 86 | 42 | 48 | 85 | 98 | 44 |
|  | STD: | 5 | 5 | 7 | 14 | 17 | 8 |
| −8 | 3 | 75 (−42) | 33 (−4) | 29 (88) | 117 (−38) | 79 (−51) | 28 |
|  | MIN: | 70 | 31 | 25 | 113 | 73 | 24 |
|  | MAX: | 83 | 37 | 35 | 120 | 89 | 31 |
|  | STD: | 6 | 3 | 4 | 3 | 7 | 3 |
| −9 | 48 | 76 (−45) | 31 (0) | 31 (17) | 48 (15) | 63 (−37) | 26 |
|  | MIN: | 67 | 23 | 17 | 16 | 15 | 6 |
|  | MAX: | 101 | 48 | 59 | 87 | 106 | 54 |
|  | STD: | 5 | 4 | 6 | 17 | 21 | 9 |
| −10 | 8 | 87 (−47) | 40 (6) | 46 (12) | 58 (29) | 87 (−37) | 50 |
|  | MIN: | 71 | 28 | 28 | 35 | 61 | 31 |
|  | MAX: | 98 | 50 | 64 | 74 | 117 | 74 |
|  | STD: | 10 | 8 | 13 | 15 | 20 | 16 |
| −11 | 137201 | 68 (−44) | 24 (−4) | 20 (−9) | 11 (−3) | 8 (−4) | 4 |
|  | MIN: | 60 | 18 | 14 | 3 | 0 | 0 |
|  | MAX: | 127 | 57 | 70 | 88 | 134 | 78 |
|  | STD: | 3 | 3 | 4 | 6 | 13 | 6 |
| −12 | 4330 | 67 (−44) | 23 (−2) | 21 (−1) | 20 (−4) | 16 (−9) | 7 |
|  | MIN: | 60 | 18 | 15 | 9 | 1 | 0 |
|  | MAX: | 92 | 42 | 47 | 86 | 101 | 48 |
|  | STD: | 3 | 3 | 4 | 9 | 13 | 6 |
| −13 | 59 | 75 (−44) | 31 (0) | 31 (6) | 37 (8) | 45 (−23) | 22 |
|  | MIN: | 67 25 | 22 | 13 | 6 | 3 |  |
|  | MAX: | 94 | 42 | 52 | 84 | 101 | 56 |
|  | STD: | 5 | 4 | 6 | 16 | 21 | 11 |
| −14 | 369 | 77 (−46) | 31 (1) | 32 (12) | 44 (17) | 61 (−35) | 26 |
|  | MIN: | 67 | 23 | 19 | 19 | 19 | 7 |
|  | MAX: | 134 | 72 | 87 | 99 | 149 | 80 |
|  | STD: | 8 | 6 | 8 | 11 | 19 | 10 |
| −15 | 3 | 86 (−47) | 39 (0) | 39 (34) | 73 (9) | 82 (−46) | 36 |
|  | MIN: | 82 | 35 | 34 | 49 | 59 | 24 |
|  | MAX: | 93 | 44 | 45 | 87 | 104 | 47 |

For example, in the preferred embodiment, the data for wetland class 2 (E1OWL) has mean values of 66, 24, 18, 11, 7 and 3 for Landsat TM bands 1, 2, 3, 4, 5 and 7 respectively. The minimum values for the Landsat scene for the NWI classification, E1OWL are 59, 18, 12, 3, 0 and 0 and the maximum values are 125, 72, 83, 133, 136 and 82. Finally, the standard deviations for E1OWL are defined for the following bands as being 5, 4, 5, 9, 12 and 5. These data are based on a total of 72,440 Landsat pixels for NWI class 2.

Referring now to FIG. 2, a block hardware diagram of the low resolution image input and processing hardware 200 is shown. The hardware arrangement 200 comprises a low resolution data memory 210 containing the low resolution pixel representations.

In the preferred embodiment, these pixels are LANDSAT thematic mapper data. Typically, the pixels are stored in the memory so that each pixel is separately addressable. As a result, cross-correlated individual pixels may be required for small wetland areas. The Landsat TM signals provide seven spectral bands of information. Of the seven bands, band six is not selected from the satellite vector information by the selector 212. Only the optimum bands for the desired cross correlation are selected. The selector 212 can be programmed to by-pass or select those bands identified as either being unnecessary or as being important to the process.

In the preferred embodiment, band 5 (1.55–1.75 um) has traditionally been considered the single most important band for its ability to discriminate levels of vegetation and moisture in the soil. Band 4 (0.76–0.90 um) is also important with respect to classifying vegetated communities and vegetation moisture. These data are helpful for inferring the existence of wetlands. Finally, band 3 (visible green) is valuable for measuring and defining deviations on a cell by cell basis (pixel-by-pixel).

The selected bands are then geo-referenced and registered to the high resolution data. The geo-referencing processor 214 can comprise a conventional processor programmed with commercially available geo-referencing software, or specialized hardware. A variety of geo-referencing programs and techniques may be employed by processor 214. For example, a Global Positioning System (GPS) may be used to precisely locate each pixel or polygon. The advantage of using GPS is that it tends to produce a lower root mean square (RMS) error. However, in the preferred embodiment, a low resolution to high resolution data correction process is used so that the satellite image is accurately geo-referenced to the sub-pixel level. As a consequence, there is minimal displacement artificial between data sets. To avoid numerical problems with a polynomial approach, as well as to remove dominant errors, ephemeris data are used to correct to smaller errors (such as clock errors and space-craft-instrument misalignment).

In the preferred embodiment, the following procedural steps (which are discussed below in more detail) are used to geo-reference the low resolution TM data:
1. Perform a system geometric correction on a single TM band (usually band 4);
2. Use USGS or customer-supplied maps to identify control points within the scene;
3. Apply ephemeris data to correct geometric error in the TM image; and
4. Given the area and location of the control points for the correct position, determine the errors in the attitude of the space craft.

Figure 4:
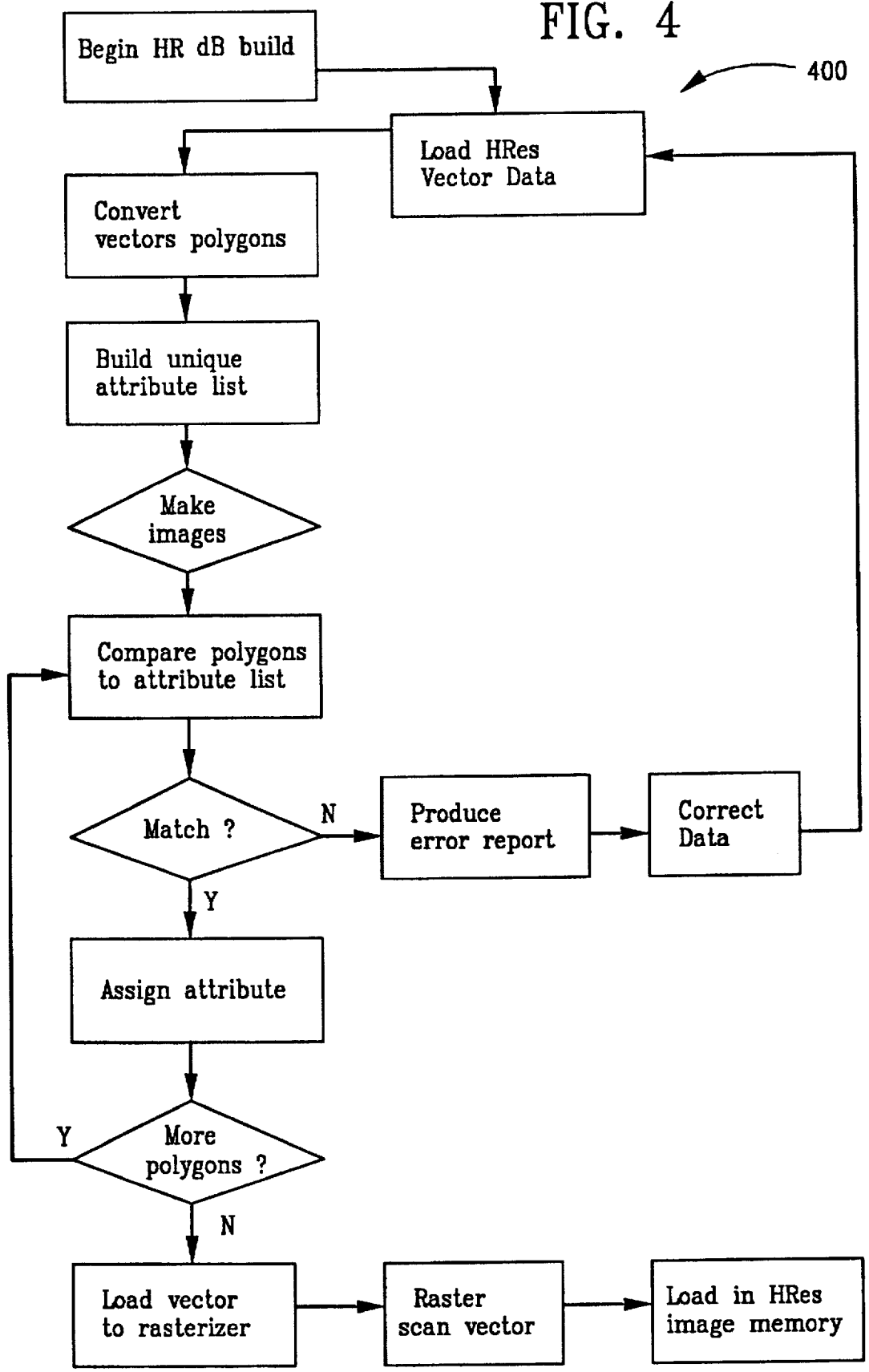
FIG. 4 is a block flow diagram showing the steps for performing high resolution data processing.

Once the control points are ascertained from the geo-reference processor 214, the satellite image is rectified by unit 216 based upon the geometric correction value coefficient. Details of the rectification process performed by unit 216 are set forth in FIG. 5. The resulting rectified low resolution map image is then re-sampled by a rasterizer or other appropriate device to the chosen cell size. For example, in the preferred embodiment, a 25 by 25 meter-sized pixel cell is used (FIG. 4). The rasterized image lines are then stored in the low resolution image memory 219 for later use.

FIG. 3 illustrates a detailed block-diagram of the two-pass cross-correlation apparatus forming a part of the present invention.

Specially, FIG. 3 illustrates the two pass cross-correlation between the desired classes of the high resolution data and the brightness values of the low resolution data. The Z-statistic can be calculated as shown below:

$$Z = 0, \text{ if } c_j = 0$$

$$Z = \left( \sum_{i=1}^{n} ((O_i - M_{ij})/SD_{ij})^2 \right) * SF$$

$$Z = 0, \text{ if } C_j > C_{max}$$

where:

$C_j$ is the assign class number derived from the high resolution data, $C_{max}$ is the maximum number of classes from the high resolution data to be processed, n is the number of bands of the low resolution data used, i is a counter from one to n, $O_i$ is the brightness value of the cell for the ith band of the low resolution data, $M_{ij}$ is the mean of the brightness values for band i of the low resolution data and data $C_j$ of the high resolution data, $SD_{ij}$ is the standard deviation of the brightness values for band i of the low resolution data and class $C_j$ of the high resolution data, and j is the class counter SF is a scale factor used. SF is chosen to increase the mean value of the calculated Z-statistic to be approximately 128.

In FIG. 3, a memory 310 is provided for storing the pixel values of the low resolution data and the corresponding cell value of the class derived from the high resolution data. In the first pass of the cross-correlation technique of the preferred embodiment, the mean and standard deviation for each of the wetland class delineated from the high resolution data are computed. These mean and standard deviations are computed for each of one of the wetland classes during the first pass of this cross-correlation routine. The calculation apparatus for the first pass is shown in FIG. 1.

In the second pass, a Z-statistic value is created for each pixel in the study area. In the preferred embodiment, for example, the Z-statistic is zero (0) for all cells not identified as wetland from the NWI maps derived from the high resolution data. For studying other phenomena, the Z-statistic value can be set to reflect the characteristics that are desired to be measured, and set to zero for those that are not measured. This is processed by the class comparator 311. That is, if for the pixel being processed, the class value is zero (0) or greater than the maximum class value (max), then the Z-statistic is zero (0). For all other values of (j), the Z-statistic is computed by first subtracting the observed brightness value for a band $(O_i)$ from the mean brightness value $(M_{ij})$ for bank (i) and class (j), where class (j) is the class value for the pixel being processed. The difference between the mean brightness value for a band and a class, and the observed brightness value, of a band for the pixel, is obtained in the subtractor unit 312.

The divider 314 then divides this difference from subtractor 312 by the standard deviation previously calculated for band i and class j, where class j is the class for the pixel being processed. The above process normalized each difference in the observed and expected values for each mean. These normalized differences are then added together to derive an accumulated measure of deviation for each particular cell (pixel). This is done by the adder 318. The accumulated value is then multiplied in unit 316 by a scalar. The scalar is selected to distribute the Z-statistic between 0 and 255 with a mean of approximately 126. The resulting statistic is then compared to an a-priori threshold. The comparison is made by the comparator 320, with the threshold value, and is stored in memory 322.

The greater the Z-statistic, the greater the deviation of the observed pixel from the expected values for a pixel of wetland type j. It has been found that a Z-statistic with a value greater than a stored threshold of 90 stored in memory 322 indicates an area likely to have changes. A Z-statistic less than 90 indicates that significant change has not likely occurred from the type phenomena that was mapped with the high resolution data when compared to the more recent low resolution data.

Z-statistics that are less than 90 may also be of interest. It was found that Z-statistic values between 50 and 90 may indicate potentially changed areas that require further investigation. In the preferred embodiment, where Z-statistics between 50 and 90 were found for areas, it appears that there either may have been (1) errors initially made in mapping those areas or, (2) the errors in the wetland typed had changed, only marginally, but the area still remained a wetland. Thus, the threshold memory typically would discriminate three separate categories: (1) statistical scores greater than 90 that indicate areas with significant changes, (2) statistical scores between 50 and 90 that indicate potential areas of change that require further evaluation, and (3) statistical scores of less than 50 that delineate areas that have had little or no detectable changes. Thresholds can obviously be varied depending upon the type of phenomena being evaluated.

A change value derived from the comparator 320 is then provided to an appropriate printer/plotter device 326 or display 324 to show the designated areas of change. Detailed illustrations of these maps or displays are shown in FIGS. 7-12.

Referring now to FIG. 4 a detailed flow chart 400, illustrating the steps necessary to process high resolution data are shown. In particular, at step 402, the ingestion of high resolution data routine is initiated. In the first step, the high resolution data 404 are loaded into the memory step 406, the data in the memory are converted into appropriate polygons. A conversion program can be used for this task. For example, the aforementioned Arc Info module can accomplish this step.

An unique attribute list is then built. In the preferred embodiment, there are typically over 200 unique wetland types such that, at step 408, each of the unique types are assigned a code. There is one record in the attribute table for each unique attribute found. If more data are required, then the program loops back at 410 to step 404 in order to load additional high resolution data. If all vector files have been converted into polygons, and the attributes loaded, then the comparison and attribute coding routine (as previously discussed) is initiated at step 414. The polygon attributes are compared to the list of unique attributes built in step 408.

In the preferred embodiment, the vector codes are then compared to the wetland group attributes as identified in Table 1.1. If a match exists, then the appropriate integer image code is assigned at step 417. For example, in the preferred embodiment, the integer code can be the NWI classification scheme. In the event that a match is not found, an error statement is produced, and the erroneous data are corrected. The corrected vector file is processed in step 404.

In the preferred embodiment, all non-wetland polygons are assigned a zero value at step 417. The memory is then accessed to determine whether all vectors have been processed at step 408. If not, then the process loops back at step 426 to step 414 to compare to the attribute table. Once the loop is completed, the resulting polygons are loaded into the rasterizer 430 and a raster scan of the vector line then proceeds at step 432. The raster image of high resolution data that is fully attributed by the high resolution code, is loaded into memory 438. Accurately co-registering the low resolution data and the high resolution data is critical to the success of detecting true changes with this cross-correlation procedure and not detecting and reporting false changes. Falsely reported changes are termed commission errors. Commission errors occur when an area is identified as having changed, but no change really occurred in that area. A major potential source of commission error in the use of this cross-correlation procedure is using low resolution and high resolution data that are not precisely co-registered. In the preferred embodiment, the source for low resolution data is usually satellite data, i.e. Landsat Thematic Mapper data, and the informational source for the high resolution data is generally vector data derived from aerial photography. Satellite data, because it is collected from a very stable platform in space, can usually be geocoded (georeferenced) to map projections with great precision. The positional accuracy of features derived from satellite data is usually very good.

However, aerial photography is collected at much lower altitudes than satellite data and with an unstable base (i.e. aircraft), that is constantly experiencing changes in pitch, roll, and yaw. These changes adversely affect the positional accuracy of features delineated from aerial photography. The co-registration of the low resolution data and high resolution data is critical. For example if because of misalignment of the two data sets, a wetland area delineated on the high resolution data is aligned with an upland area on the low resolution data, a false change will be detected.

Figure 5A:
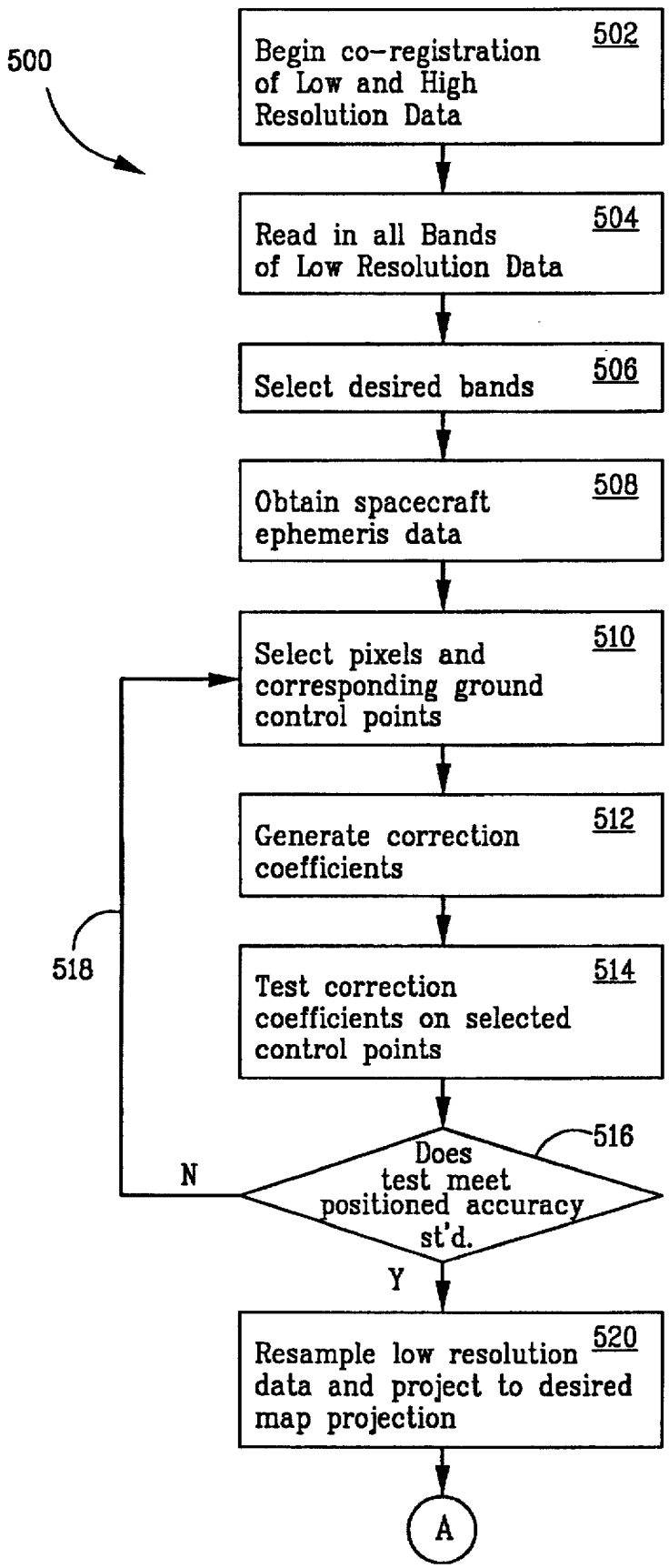
FIGS. 5A and 5B are a block flow diagram showing the steps for performing low resolution data processing.
Figure 5B:
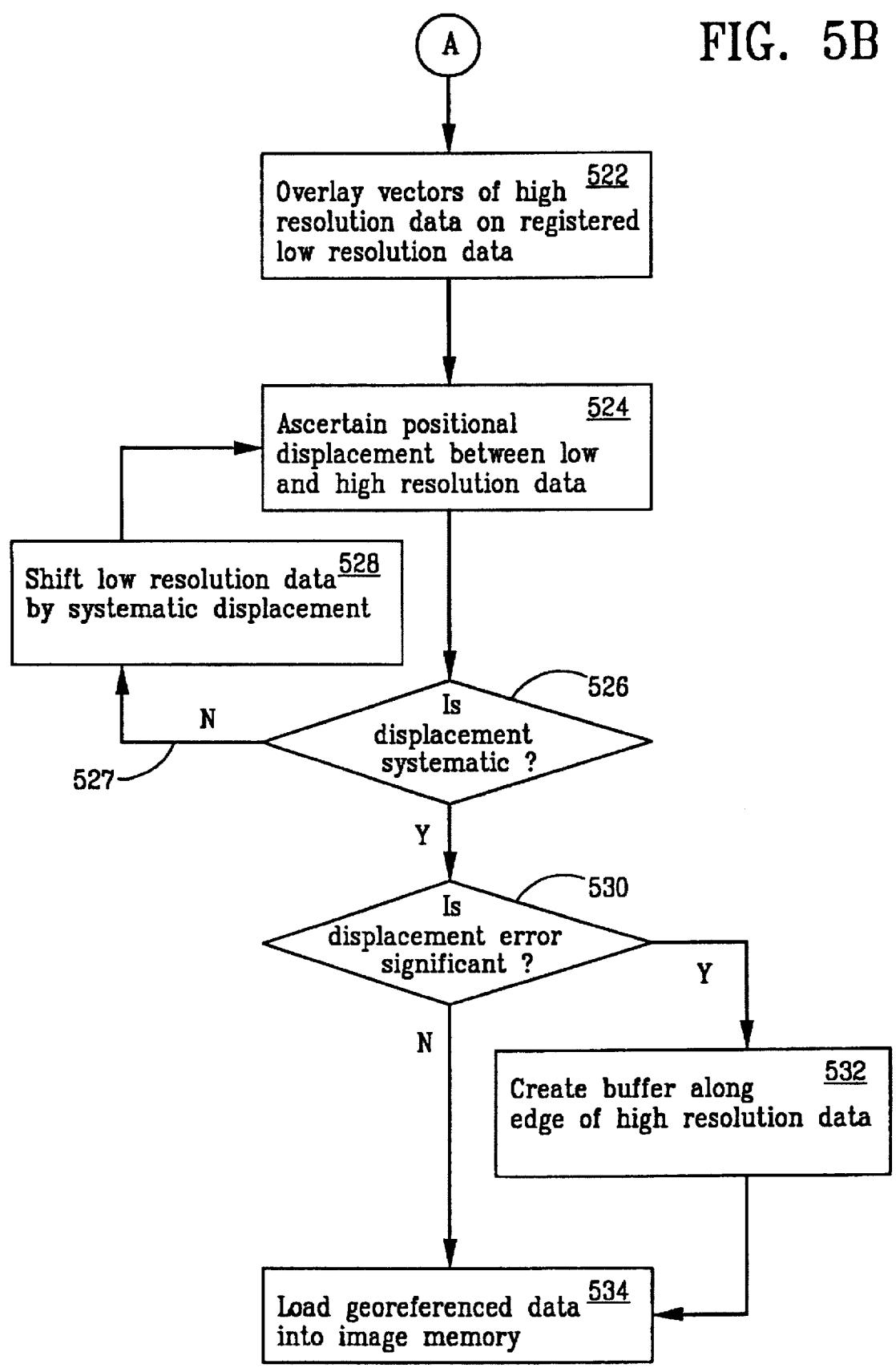

FIG. 5 illustrates the procedures used to co-register the low and high resolution data sets. The accuracy of the co-registration is also appraised. Knowledge of the accuracy of the co-registration of the low and high resolution data sets is critical in interpreting the final results of this cross-correlation procedure. When the two data sets will not co-register accurately, a buffer equal in length to the co-registration error is produced from the edge of all features mapped on the high resolution data. All changes detected within this buffered area may not be real and may be strictly the result of the error in registration of the two data sets.

In FIG. 5, the co-registration 500 of the low resolution data to the high resolution data is illustrated. The routine 500 begins with step 502 where the low and high resolution data are loaded into memory 502 and the appropriate bands of low resolution data are selected. In step 506, ephemeris data on the position of the satellite are pulled for use in creating the correction coefficients. The ephemeris data can only provide positional accuracy within a kilometer for Landsat data. To improve the positional accuracy, ground control points must be selected from topographic maps and the locations of these points within the low resolution of the image must be identified 510. Using the ephemeris data and the ground control points, a correction coefficient is calculated 512 and the accuracy of the correction coefficient is tested on the ground control points 514. If the positional accuracy does not meet the a priori accuracy standard (i.e. 30 meters for Landsat Thematic Mapper data) 516, loop 518 sends the process back to 510 where additional control points are selected. The 518 loop to 510 to 516 is repeated until the a priori positional accuracy standard is met. Once the positional accuracy standard is met, the low resolution data are resampled to the appropriate cell size and projected to the desired projection system 520. The vectors of the high resolution data are then merged with the geocoded low resolution data 522. The positional accuracy of the co-registered data sets is ascertained in step 524. If the positional accuracy of the co-registered data is systematic, that is all the displacement is in the same direction 526, the geocoded low resolution data can be shifted at 528 to improve the co-registration of the data sets. If the final displacement is still significant as determined by step 530, a buffer is created that identifies the areas for which high Z-statistics are likely to be computed—not because of actual change, but because of the displacement between the low and high resolution data sets. This buffer will be used to identify areas for which confidence of detection-true change is low. The best geocoded data set that can be produced is then loaded into image memory for the Z-statistic calculations 534.

Figure 6:
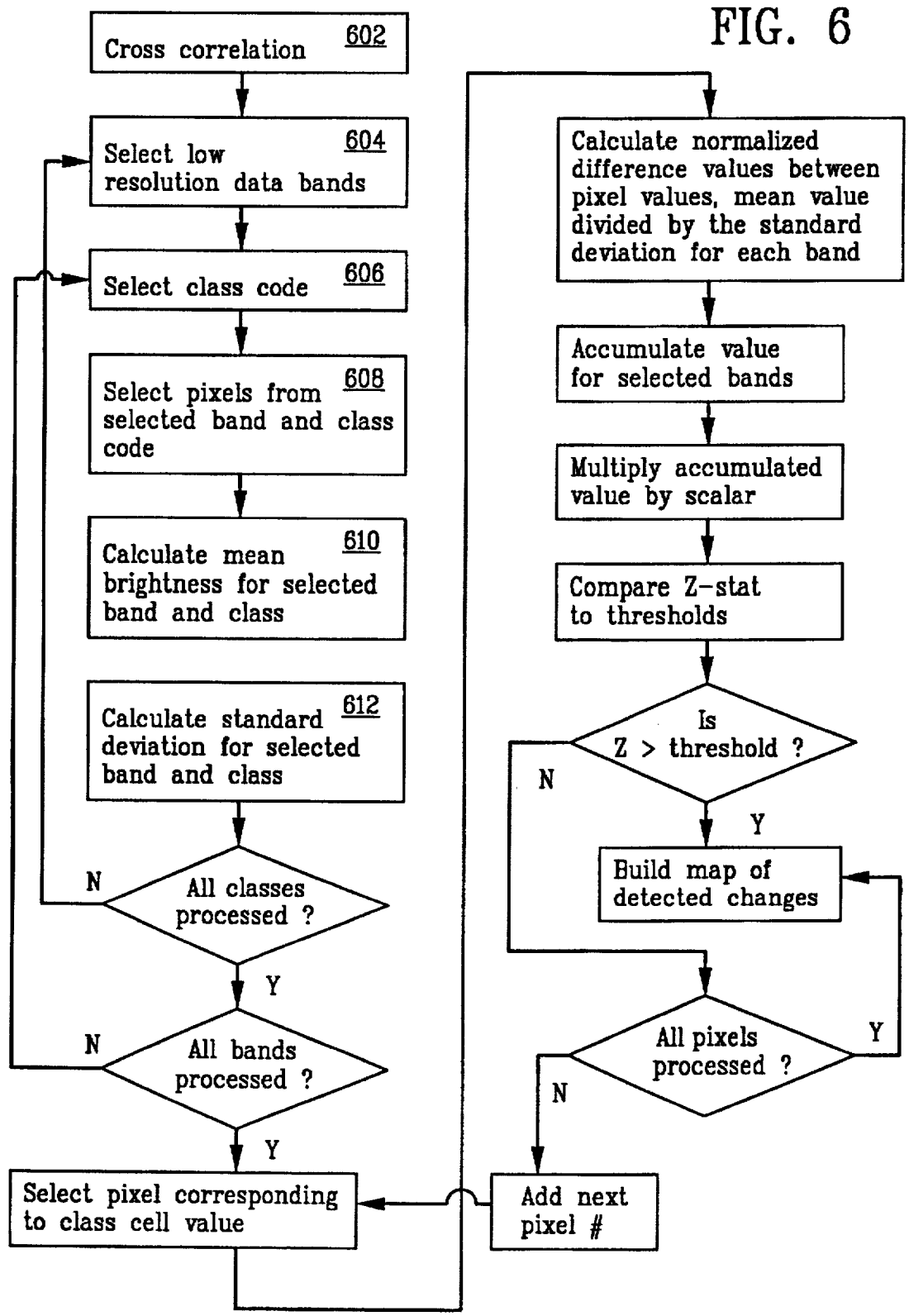
FIG. 6 is a block diagram of the cross-correlation steps of the present invention.

FIG. 6 illustrates the steps used in the cross-correlation technique. The cross-correlation technique 600 is entered at step 602. This technique employs a two-pass process through the low resolution and high resolution data sets. In the first pass (steps 604–616), the informational classes derived from the high resolution data are characterized by the low resolution image data. For each informational class derived from the low resolution data, the mean brightness value and the standard deviation of the mean brightness value are calculated for each selected band of the low resolution image data. In the second pass (steps 618 through 632), a Z-statistic is computed from the brightness values of the pixels from the low resolution image data and the mean and standard deviation of the brightness value of the informational class for the pixel. High Z values identify pixels that have changed between the time that the high resolution data were collected and the time that the low resolution data were collected.

In step 604, the next band of the low resolution data to be processed is selected. In step 606, the next informational class derived from the high resolution data source to be processed is selected. Step 608 selects all pixels for the low resolution band being processed that are assigned the selected informational class derived from the high resolution data source. The mean brightness value for the selected band and class are calculated in step 610 and the standard deviation of the brightness value for the selected band and class are calculated in step 612. Step 614 determines if the mean and standard deviation for all classes for the selected band have been processed. If not, the next class to be processed is determined in step 606. If the mean and standard deviation for all classes have been processed, the technique proceeds to step 616 to determine if all bands have been processed. If all bands have not been processed, the technique selects the next band for processing 604 and continues the above process. If the mean and standard deviation have been calculated for all classes and all bands, the procedure begins the second pass through the low and high resolution data to ascertain the Z-statistic for each pixel. This second pass begins at step 618.

Step 618 begins the pixel-by-pixel processing steps to calculate a Z-statistic for each pixel. In step 618, the brightness values of all bands of the low resolution data and the class value derived from the high resolution data are obtained for the next pixel to be processed. In Step 620, the normalized differences between the mean brightness values for the class value of the pixel and the observed brightness values are calculated. The normalized difference is calculated by calculating the difference between the observed brightness value and the mean brightness value, dividing this difference by the standard deviation, and squaring this value. This normalized difference is calculated for each band of low resolution data being processed. In step 622, the normalized difference for each band processed is accumulated for all of the selected bands. This accumulated normalized difference is then multiplied by the selected scalar in step 624 to calculate the final Z-statistic for each pixel. The scalar is selected to adjust the Z-statistic values so that the majority of Z-statistic values will range in value from 0 to 255. In Step 626, the calculated Z-statistic is compared with an a priori threshold. If the Z-statistic for a pixel exceeds this threshold, then the pixel is used to map the detected change in step 632. Step 628 determines if all pixels have been processed. If all pixels have not been processed, the procedure loops back to step 618 and begins the pixel processing for the next pixel. When all pixels have been processed, the procedure ends.

FIGS. 7, 8, 9, 10, 11 and 12 each represent different stages of the image processed by the instant invention in the preferred embodiment.

Figure 7:
FIG. 7 is gray scale photograph of the preferred embodiment using a Landsat thematic mapper image of bands 3, 4 and 5 of a wetland study area.
Figure 8:
FIG. 8 is a map of FIG. 7 based on a gray-scale image of Z-statistic values ranging between 0 and 255 where low values are dark while higher values are proportionally lighter.
Figure 9:
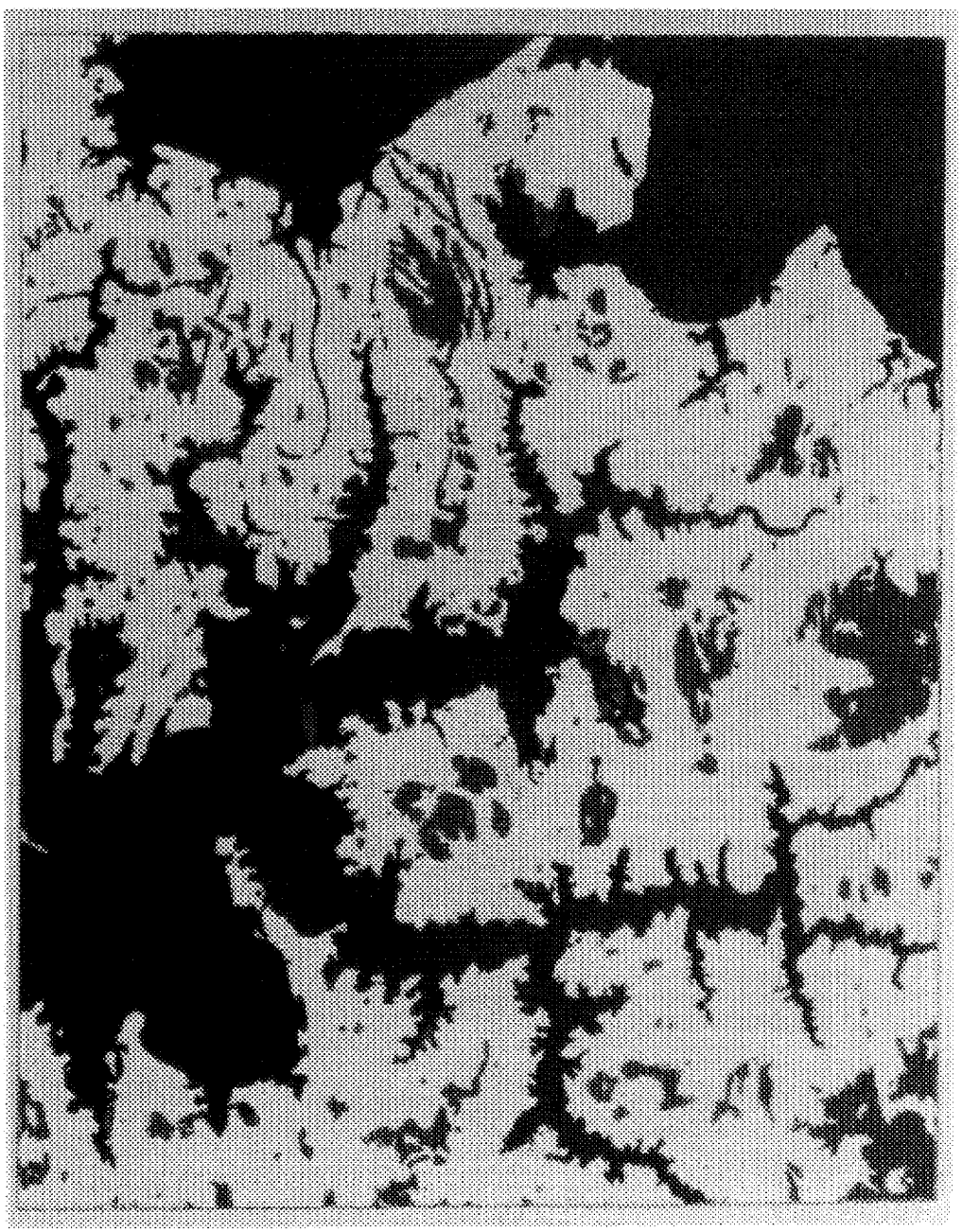
FIG. 9 is a map of FIG. 7 based on a generalized aerial photograph using the NWI classification system for the year 1982.
Figure 10:
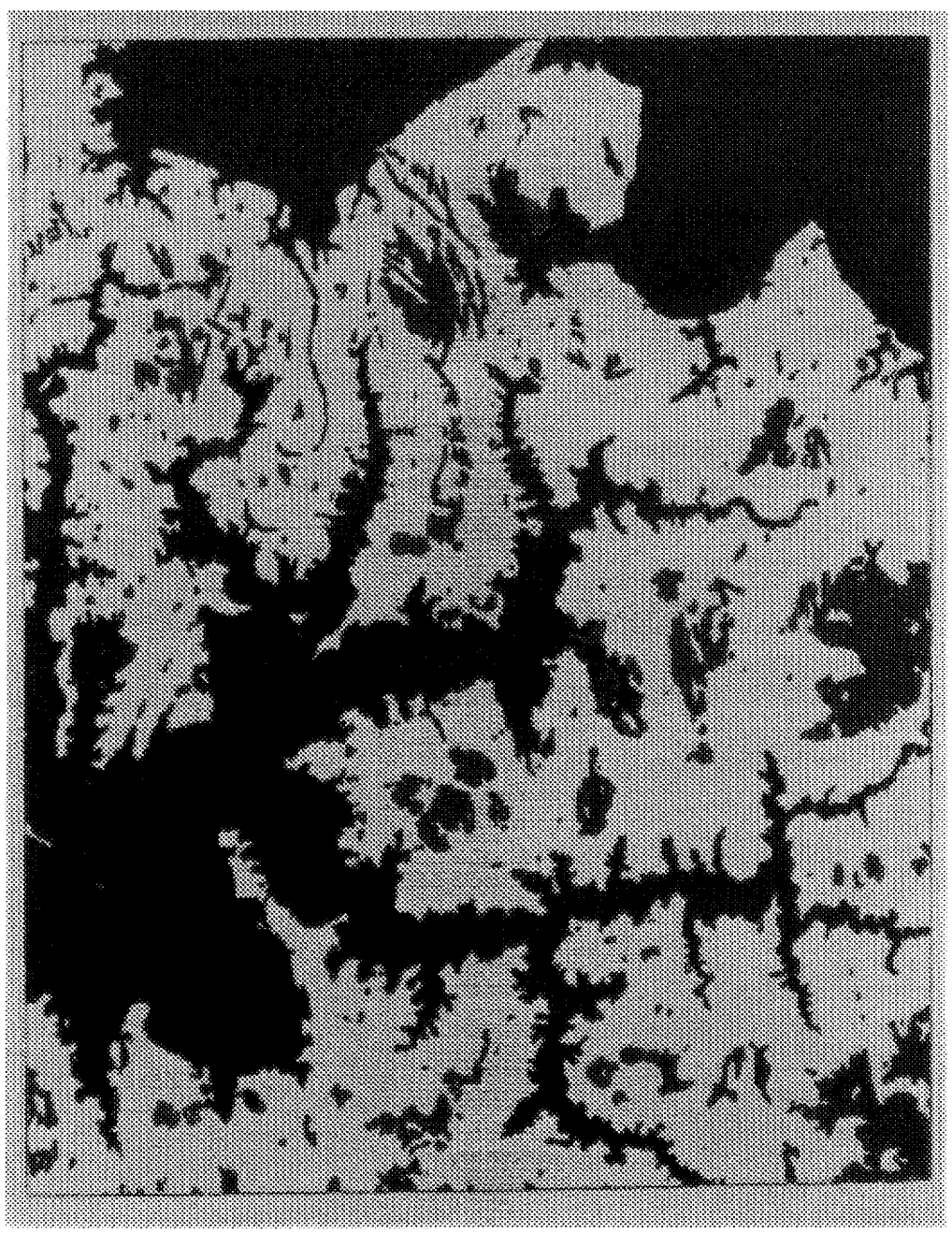
FIG. 10 is the map of FIG. 7 based on the NWI classification system for 1992.
Figure 11:
FIG. 11 is a detailed map of FIGS. 9–10 showing the changes between 1982 and 1992 derived from comparing aerial images for both time frames.
Figure 12:
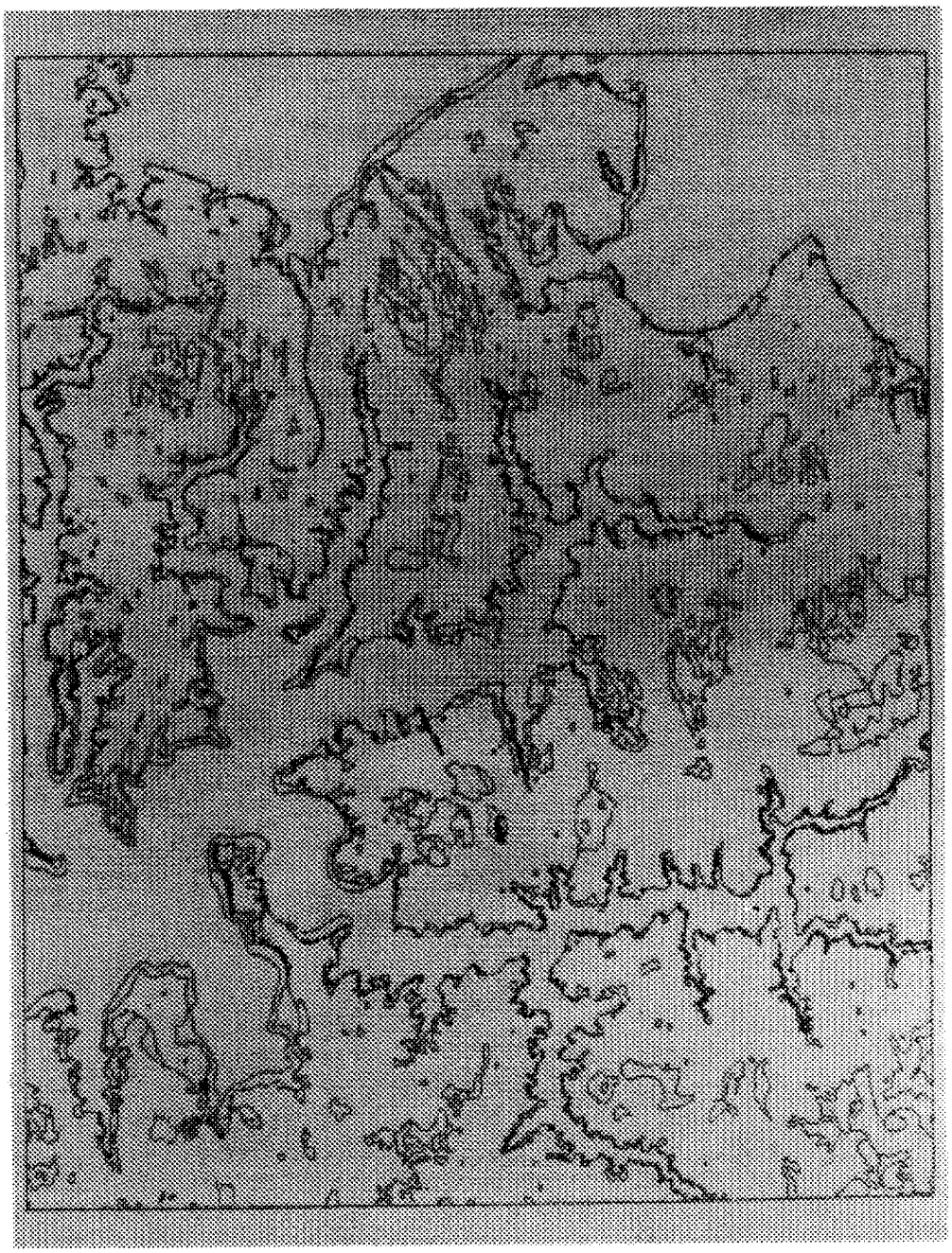
FIG. 12 is a map of FIG. 9–10 which represents a cross-correlation analysis map of the wetland changes resulting from the ungrouped classes between 1982 and 1992.

In particular, FIG. 7 represents a gray scaled Thematic mapper image covering a study area. This image uses bands 3, 4 and 5 (filmed to green, red and blue respectively). For the Z-statistic, the same area is then presented in FIG. 8 as a gray scaled image. Low values are shown as darker shades of gray while the higher values are proportionally lighter. The Z-statistic ranges in value in this image from 0 to 255. The 1982 generalized NWI classification system for the study area in FIGS. 7–8 is shown in FIG. 9. FIG. 10 shows the 1992 NWI classification for the study area. The detailed changes between the 1982 and 1992 high resolution analyses (aerial photography) for the study area are shown in FIG. 11. Finally an illustration of the results of the cross-correlation analysis of the wetlands change system applying the thresholds derived from the NWI classes is shown in FIG. 12.

It should be understood that the present invention is not limited to the classification of wetlands data. Instead, it can also be used as a classification or change detector with any available low resolution data and may be used for classification of land use and land cover, including oceans and other water bodies.

For example, the present invention can be used to verify the initial NWI classification of wetlands. In this application, a Landsat TM scene is acquired for approximately the same date that the high resolution aerial photography was acquired. As discussed above the Landsat TM imagery serves as the low resolution data and the aerial photography serves as the high resolution data. The objective of this application is not to detect changes in wetlands that have occurred over time (since the sources of data were acquired at approximately the same time), but to verify the positional accuracy of the vectors derived from the aerial photography that maps and classifies the wetlands and the consistency of the classification of the wetlands. High Z-statistics under this application indicate positional accuracy errors or inconsistencies in the classification. If the high Z-statistics occur at the borders of wetlands and uplands, this provides strong evidence that the vector wetland data are not accurate geometrically. Other high Z-statistics may indicate that the wetland interpreter mis-classified wetlands. Creating the Z-statistics prior to finalizing and distributing the wetland maps may reduce potential errors in these maps. Implemented as described above, this invention provides a quality control step for the initial NWI mapping that is very economical. Another example of how the system is used is for monitoring global change. Monitoring global change is a priority for NASA. As part of NASA's "Mission to Planet Earth", over $11 billion will be spent on the deployment of new satellites to monitor global change. This invention can be used with currently available satellite data and the new satellite systems proposed to aid in monitoring global change. As an example, forests can be mapped in detail using Landsat TM scenes. Changes to the forests can be effectively monitored by this invention. The vector data on the location and type of forests would be obtained from the Landsat data. These vectors would be compared to low resolution, less expensive, satellite data and changes (forest losses) could be delineated. AVHRR LAC data (with a spatial resolution of 1.1 km) could serve as the inexpensive source of low resolution data for monitoring global forest changes.

In a similar manner as the examples described above, this invention can be used in a cost effective manner to: monitor agricultural expansion, monitor urban expansion, monitor range land loses, monitor forest loses, identify areas of forest degradation (by disease, insects, or fire), identify losses of submerged aquatic vegetation, and monitor natural disasters. Obviously, numerous modifications and variations of the present invention are possible in view of the above teachings. It is therefore to be understood that within the scope of the appended claims the invention may be practiced otherwise and as specifically described herein.

We claim:

1. A system for analyzing changes in image features comprising:

image data classification means for classifying high resolution image data into groups and summary groups;

rasterizing means for processing said high resolution image data into cells of a unitary size;

low resolution input means for retrieving and processing low resolution image data that correspond to said classified high resolution image data, comprising:

selector means for selecting spectral bands of said low resolution image data best-suited for cross-correlation with said high resolution image data, geo-referencing means for geo-referencing said selected bands, co-registration means for co-registering said selected bands with said high resolution image data, and low resolution rasterizing means for processing said selected bands into cells of said unitary size;

cross-correlation means for defining a statistical value representing degree of change between said classified high resolution image data and said corresponding low resolution image data;

threshold means for comparing said cross-correlation statistical value in order to redefine thresholds representing significant, medium and low degrees of image change; and mapping means for producing maps representing cells having maximum amounts of change.

2. The system according to claim 1, wherein said selector means selects spectral bands according to their utility in discriminating identifying characteristics of said image features.

3. The system according to claim 1, wherein said cross-correlation means includes:

means for determining a mean and standard deviation for each class code derived from said high resolution image data for each of said selected bands of said low resolution image data; and Z-statistic calculating means for determining a Z-statistic value for each cell of said low resolution image data.

4. The system according to claim 3, wherein said threshold means includes:

an a priori threshold value for each class; and a means for comparing said Z-statistic for each cell of said low resolution image data to said threshold value for said class in order to determine if any changes in said topographical feature has occurred.

5. The system according to claim 1, wherein said geo-referencing means includes:

means for creating correction coefficients for improving positional accuracy of said topographical features derived from said selected bands of said low resolution image data by using ephemeris data from a satellite generating said low resolution image data and ground control points from a map of said image features; and means for testing the accuracy of said coefficients on said ground control points, and recalculating said coefficients until an a priori accuracy standard is met.

6. The system according to claim 1, wherein said co-registration means comprises:

means for merging said polygonal vectors of said high resolution image data with said geo-referenced low resolution image data;

means for measuring and correcting displacement between said high resolution image data and said low resolution image data; and means for creating a buffered area based upon said displacement.

7. The system according to claim 3, wherein said Z-statistic calculating means comprises:

means for obtaining mean brightness values of all bands of said low resolution image data and a class value derived from said high resolution image data for a cell to be processed;

means for calculating a normalized difference between said mean brightness values and an observed brightness value for said selected bands of said cell;

means for accumulating said normalized difference for all said selected bands; and means for multiplying said accumulated differences by a selected scalar.

8. The system according to claim 1, wherein said cells of unitary size are 25 by 25 meter-sized pixel cells.

9. An image processing system for analyzing changes in image features comprising:

a high resolution database for storing high resolution data as digital line graph ("DLG") data;

a classification scheme for topographical features represented within said high resolution data;

an attribute memory connected to said database for storing coding classifications according to said classification scheme;

a converter for converting said DLG data into polygonal vectors conforming to said topographical features;

a high resolution rasterizer for processing said high resolution data into 25 by 25 meter-sized pixel cells;

a high resolution vector memory for storing said rasterized high resolution data;

an attribute assignment device for assigning attribute data to said polygonal vectors;

a selector device for selecting optimal spectral bands of low resolution data for cross-correlation with said high resolution data;

a geo-referencing device for geo-referencing said selected bands of low resolution data;

a co-registration device for registering said low resolution data to said high resolution data;

a low resolution rasterizer for processing said low resolution data into 25 by 25 meter-sized pixel cells;

a low resolution data memory for storing said rasterized low resolution data; and a cross-correlation device for defining a statistical value representing degree of change between said high resolution data and said associated low resolution data.

* * * * *